June 19, 1945.  H. S. OGDEN  2,378,785
ELECTRIC MOTOR CONTROL SYSTEM
Filed March 22, 1944
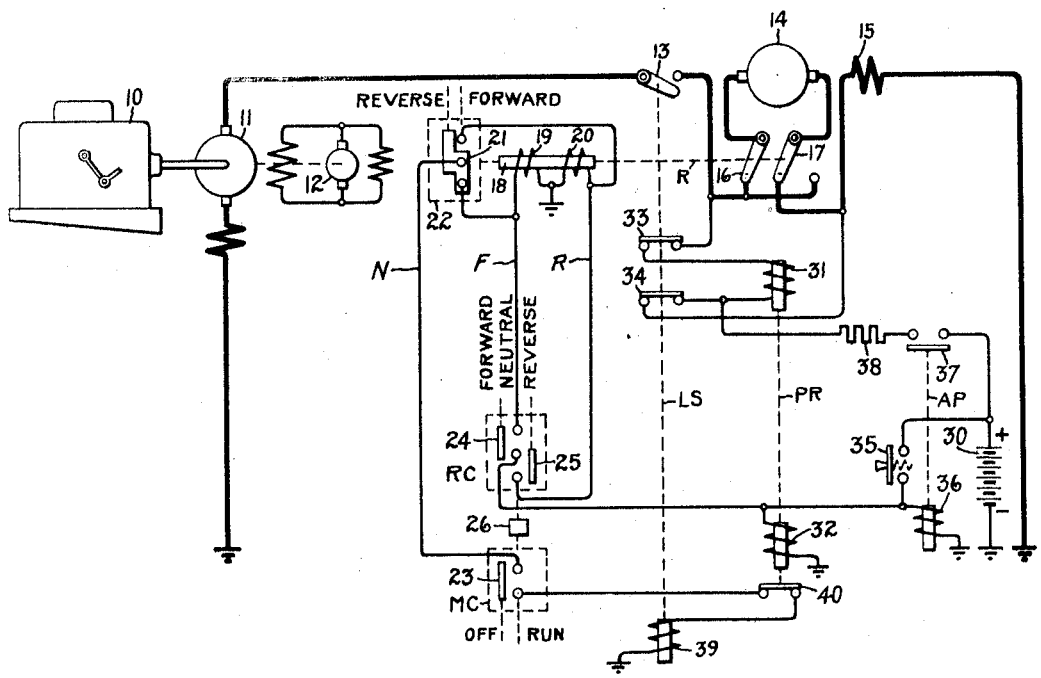
Inventor:
Harold S. Ogden,
by *Harry E. Dunham*
His Attorney.

Patented June 19, 1945

2,378,785

UNITED STATES PATENT OFFICE 2,378,785

ELECTRIC MOTOR CONTROL SYSTEM

Harold S. Ogden, Erie, Pa., assignor to General Electric Company, a corporation of New York Application March 22, 1944, Serial No. 527,634

11 Claims. (Cl. 172—179)

My invention relates to electric motor control systems, and more particularly to electric traction motor control systems for either self-propelled electric vehicles of the gas- or Diesel-electric type or straight electric vehicles receiving energy through a trolley wire.

There is a tendency upon the part of some operators of electric vehicles to attempt rapid deceleration by "plugging," that is, reversing the power connections of a traction motor before the vehicle has come to rest. Such reversal connects the motor as a generator in aiding relation with the engine driven generator and causes a destructively large current on the motor circuit. While plugging is permissible and useful in applications wherein the motor has been provided with a system of braking resistors for absorbing the current generated, it is particularly injurious when means for absorbing the energy is not provided. In a vehicle on which means for absorbing the power generated by plugging has not been provided, harmful effects such as wheel slippage, overloading of the prime mover, or damage to the traction motor or its gearing may be caused. This effect is aggravated when the traction motors are of the series type, as is common in vehicle drive applications.

Accordingly, it is one object of my invention to provide new and improved means for preventing "plugging" or reversal of an electric motor while the motor is running or coasting in either direction.

More specifically, it is an object of my invention to provide means independent of the direction of motion of a self-propelled electric vehicle for preventing reversal of the traction motor connections while the vehicle is in motion in either direction.

My invention itself will be more fully understood and its various objects and advantages further appreciated by referring now to the following detailed specification taken in conjunction with the accompanying drawing, the single figure of which is a schematic circuit diagram of an electric traction motor control system embodying my invention and shown applied to a self-propelled vehicle.

Referring now to the drawing, I have shown by way of illustration an electric power and motor control system comprising a prime mover 10, which may suitably be of the internal combustion engine type, connected to drive a main generator 11 and a generator exciter 12. The generator 11 may be connected through the normally open main contact 13 of a line switch LS to supply current to an electric traction motor having an armature 14 and a series field exciting winding 15. It will of course be understood that I have shown only a single traction motor merely for the purpose of illustration. If desired a plurality of traction motors may be provided and connected permanently or interchangeably in series or parallel or any combination of series and parallel. However, since my invention is preferably applied to only one motor on any vehicle, only a single motor is illustrated.

The disposition of the armature 14 in the traction motor circuit is controlled by a reversing switch R having a pair of contacts 16 and 17 connected in the traction motor circuit at opposite terminals of the armature 14. The reversing switch R is arranged for selective actuation to either of two alternative positions by means of a solenoid 18 provided with a pair of actuating windings 19 and 20. It will be observed from the drawing that the contacts 16 and 17 are operable to reverse the connections of the motor armature 14 in the circuit of the generator without affecting the connections of the motor series field winding 15. Thus the residual flux of the magnetic structure of the field 15 is always in the same direction and is never reversed. This makes it possible to use a low value of field excitation current from the battery 30 even though the winding 15 is a high current capacity winding. The solenoid 18 is also connected to actuate a movable contact segment 21 on a reverser interlock controller 22 thereby selectably to connect the one or the other of a pair of wires F or R to a common wire N in dependence upon the position of the reversing switch R.

The line switch LS and the reversing switch R are controlled at the will of an operator through a pair of manually operable controllers MC and RC. The controller MC is the master accelerating controller and includes an interlock contact segment 23 which is open in the "off" position of the controller and closed in all running positions of the controller. It will be understood of course that, while only this interlocking portion of the master controller MC is shown, it is contemplated that this controller shall be provided with a plurality of running or accelerating positions arranged to control a suitable accelerating means (not shown) connected in circuit with the traction motor 14, 15. Alternatively, acceleration may be effected by varying the speed of the engine 10. The accelerating means and its control form no part of the present invention and these elements have therefore been omitted to simplify the description.

The controller RC is a manually operable reversing controller having a pair of contact segments 24 and 25 movable from a "neutral" position alternatively in opposite directions to either a "forward" position or a "reverse" position. The contact segments 24 and 25 are arranged selectably to connect the wires F or R to a source of electric current supply and thereby selectably to energize the windings 19 or 20 of the solenoid 18. It is customary to provide suitable mechanical interlocking means 26 between the master controller MC and reversing controller RC, so arranged that the reversing controller may be moved from its neutral to one of its operative positions only when the master controller is in its "off" position. Since the detailed construction of such mechanical interlocking means forms no part of the present invention, I have illustrated such means on the drawing only in block form. If desired, such interlocking means may be of the type described in Patent 1,471,893 issued to W. S. H. Hamilton et al. on October 23, 1923.

In order to prevent "plugging" or reversal of the power connections of the traction motor or motors before the vehicle has come to rest, I provide a suitable source of control power, such as a battery 30, arranged to supply excitation current to the motor series field winding 15 when the vehicle is coasting in either direction with the line switch contact 13 open. During such coasting operations, I also connect across the motor armature 14 a polarized relay PR having a directional winding 31 and a polarizing winding 32. My invention is not, however, limited to the precise form of polarized relay illustrated. For example, the polarizing winding 32 may, if desired, be replaced by a permanent magnet. The directional winding 31 of the polarized relay PR is connected through a pair of normally closed interlock contacts 33 and 34 to the line sides of the reversing switch contacts 16 and 17. By this connection, the polarized relay PR is rendered independent of the direction of rotation of the armature during coasting so long as the reversing switch R is left in its prior motoring position. Such independence results from the fact that, regardless of the direction in which the motor armature is coasting, the voltage generated therein by reason of the battery excitation of the motor series field winding 15 is always normally impressed upon the directional winding 31 with a predetermined fixed polarity.

With the foregoing understanding of the arrangement and mode of operation of the various elements of my control system, the operation of the system as a whole may now be understood from the following brief description.

Assuming that the prime mover 10 is in operation driving the generator 11 and exciter 12, power is applied to the control circuits by closing a manually operable control switch 35. The vehicle may then be set in motion by first moving the reversing controller RC to a selected position, for example "forward," and thereafter moving the master controller MC from its "off" position to its first running position. Closure of the control switch 35 energizes the polarizing winding 32 of the polarized relay PR from the battery 30 and also completes an energizing circuit for an actuating winding 36 of a motor field relay AP. The polarized relay PR does not pick up with only its polarized winding energized. The relay AP does pick up, however, and in so doing closes its contact 37 to connect the motor series field winding 15 for energization from the battery 30 through a circuit which may be traced from the positive terminal of the battery 30, through the contact 37, a resistor 38, the normally closed interlock contact 34 of the line switch LS, and the motor series field winding 15 to ground. The purpose of this field energizing circuit will be more fully described hereinafter. In the vehicle starting sequence this circuit has no function, and is interrupted as soon as the line switch LS picks up to open its normally closed interlock contact 34.

When the reversing controller RC is moved to its "forward" position, an energizing circuit is completed for the actuating winding 19 of the reverser R through the contact segment 24 of the reversing controller RC. If the vehicle has formerly come to rest with the reverser in the "forward" position shown, energization of the actuating winding 19 effects no movement of the reverser but results only in holding the reverser in the forward position. If, however, the switch R had been left in its "reverse" position, energization of the winding 19 would move the reversing switch to the "forward" position shown. With the switch in this position, the reversing interlock controller 22 puts positive battery potential upon the master controller MC through the controller segment 21.

Therefore, when the master controller MC is moved from its "off" position to its first running position after operation of the reversing controller RC, an energizing circuit is completed for an actuating winding 39 of the line switch LS. This circuit may be traced from the positive terminal of the battery 30 through the control switch 35, the contact segment 24 of the reversing controller RC, the contact segment 21 of the reverser interlock controller 22, the contact segment 23 of the master controller, a normally closed contact 40 of the polarized relay PR, and the actuating winding 39 to ground. When the line switch LS is thus energized, it picks up and closes its main contact 13 to connect the motor 14, 15 to the generator 11 for forward running or motoring operation. When the line switch LS picks up, it also opens its two normally closed interlock contacts 33 and 34, thereby to disconnect the polarized relay directional winding 31 from the motor circuit and also to interrupt the motor series field energizing circuit formerly traced from the battery through the line switch interlock contact 34.

With the motor running in the forward direction in the manner described above, it is impossible to actuate the reversing controller RC because of the mechanical interlock 26. If now, however, the manual controller MC is moved to its "off" position to deenergize the line switch actuating winding 39 and thereby to open the line switch contact 13 and permit the motor to coast, the interlock mechanism 26 does not prevent actuation of the reverse controller RC. While it is not harmful merely to reverse the motor connections during coasting operation, it is harmful to thereafter reapply power to the motor in the reverse direction before the motor has come to rest. Accordingly, my invention provides means responsive to actuation of the reverse controller RC during coasting to prevent a reclosure of the line switch LS until the motor speed has decreased to a predetermined low value or until the vehicle has come substantially to rest.

It will be noted that as soon as the line switch LS is dropped out to remove power from the motor 14, 15 and allow the vehicle to coast, the directional winding 31 of the polarized relay PR is connected across the motor armature through the line switch interlock contacts 33 and 34, and a battery excitation circuit for the motor series field winding 15 is simultaneously completed through the contact 37 of the relay AP, the resistor 38, and the line switch interlock contact 34. The traction motor 14, 15 therefore acts as a generator and supplies at its terminals a voltage having a polarity depending upon the direction of motion of the vehicle. This voltage is supplied to the polarized relay winding 31 through the reversing switch contacts 16 and 17, so that the coasting voltage normally impressed upon the polarized relay winding 31 always has a predetermined fixed polarity independent of the direction of motion of the vehicle. This polarity is such that the relay PR will not pickup.

If, now, the reversing controller RC is actuated to reverse the motor armature 14 during coasting operation, the generated motor armature voltage is impressed upon the polarized relay winding 31 with opposite polarity. This reversal is accomplished by reversing switch R, which is actuated in response to movement of the manual reversing controller RC. With the voltage on the winding 31 thus reversed, the polarized relay PR picks up and opens its contact 40. The opening of the contact 40 has no immediate effect because the master controller MC must be in its "off" position with the line switch actuating winding 39 deenergized in order mechanically to release the reversing controller RC for actuation. However, the relay PR remains picked up as long as the reversing switch R remains in any position other than in position for motoring operation in the direction in which the motor is coasting. In the assumed example with the vehicle coasting forward, the relay contact 40 is held open as long as the reversing controller RC remains in its "reverse" or "neutral" positions or until the controller RC is moved back to "forward" or until the vehicle comes to rest. Therefore, if the master controller MC is moved to its running position in an attempt to reapply power to the motor in the reverse direction, the master controller will be found ineffective to actuate the line switch LS by reason of the open circuit maintained at the contact 40.

From the foregoing explanation it will be understood that, regardless of the direction of motion of the vehicle, the polarized relay PR will not pick up when the master controller MC is first thrown to its "off" position to allow the vehicle to coast. If, however, in either direction of coasting, the reversing controller RC is thrown to its opposite motoring position during coasting operation, the polarized relay PR will pick up to disable the energizing circuit for the line switch actuating winding 39 until such time as either the vehicle comes substantially to rest or the reversing controller RC is moved back to its first position to return the reversing switch R to its initial coasting position.

While I have described only a preferred embodiment of my invention by way of illustration, many modifications will occur to those skilled in the art and I therefore wish to have it understood that I intend in the appended claims to cover all such modifications as fall within the true spirit and scope of my invention.

What I claim as new and desire to secure by Letters Patent of the United States is:

1. An electric control system comprising a direct current motor, switching means for connecting said motor to a source of electric current supply, reversing means for said motor, interlocking means permitting actuation of said reversing means only when said switching means is open to remove power from said motor, and directional voltage responsive means operable upon actuation of said reversing means to reverse said motor while said motor is coasting in either direction for disabling said switching means thereby to prevent reapplication of power to said motor in the reverse direction until said motor attains a predetermined low speed.

2. An electric control system comprising a direct current motor including an armature and a field exciting winding, switching means for connecting said motor to a source of electric current supply, means for effecting relative reversal of said armature and said field exciting winding to reverse said motor, separate means for supplying excitation current to only said field exciting winding when said motor is coasting, and means responsive to reversal of voltage of said armature during coasting operation to prevent reapplication of power to said motor until said armature attains a predetermined low speed.

3. An electric motor control system comprising a direct current motor including an armature and a field exciting winding, switching means for connecting said motor to a source of electric current supply, means for reversing the connections of said armature with respect to said field exciting winding to reverse said motor, means independent of said supply source for energizing said field exciting winding when said switching means is open to remove power from said motor, and means responsive only to reversal of voltage of said armature while said motor is coasting in either direction to render said switching means ineffective to reapply power to said motor until said motor comes substantially to rest.

4. An electric vehicle traction motor control system comprising a direct current motor having an armature and a series field winding, switching means for connecting said motor to a source of electric current supply, second switching means for reversing the connection of said armature with respect to said field winding, means including said first switching means for supplying excitation current to only said field winding when said first switching means is open to disconnect said motor from said supply source, and means responsive to a reversal of voltage of said armature while said vehicle is coasting in either direction to prevent reclosure of said first switching means until said motor comes substantially to rest.

5. An electric vehicle traction motor control system comprising a direct current motor having an armature and a series field winding, first switching means having open and closed circuit positions for controlling the connection of said motor to a source of electric current supply, second switching means for reversing the connections of said armature with respect to said field winding, interlocking means for permitting actuation of said second switching means only when said first switching means is in open circuit position, means controlled by said first switching means to supply excitation current to only said field winding when said first switching means is in open circuit position, and a directional voltage responsive device controlled by said first and second switching means and operable upon actuation of said second switching means while said vehicle is coasting in either direction to prevent reclosure of said first switching means until said motor comes substantially to rest.

6. A control system for a self-propelled electric vehicle comprising a prime mover, a direct current generator driven by said prime mover, a direct current motor having an armature and a field exciting winding, switching means for connecting said generator to supply current to said motor, reversing means for said motor, and means operable upon actuation of said reversing means while said vehicle is in motion in either direction to render said switching means ineffective to supply current to said motor until said vehicle attains a predetermined low speed.

7. A control system for a self-propelled electric vehicle comprising a prime mover, a direct current generator driven by said prime mover, a direct current motor having an armature and a series field winding, switching means for connecting said generator to supply current to said motor, reversing means for said motor, interlocking means permitting actuation of said reversing means only when said switching means is open to disconnect said motor from said generator, and means operable upon actuation of said reversing means while said motor is coasting in either direction to prevent reconnection of said motor to said generator until said vehicle comes substantially to rest.

8. A vehicle motor control system comprising a direct current electric traction motor, a source of electric current supply for said motor, an accelerating controller having an off position and a running position, a reversing controller having forward and reverse positions, interlocking means between said controllers for preventing actuation of said reversing controller while said accelerating controller is in a running position, and means responsive to actuation of said reversing controller while said accelerating controller is in said off position and said vehicle is coasting in either direction to prevent reconnection of said motor to said supply source except for motoring operation in the direction of motion.

9. A vehicle motor control system comprising a direct current electric traction motor, a source of electric current supply for said motor, an accelerating controller having an off position and a running position, a reversing controller having forward and reverse positions, mechanical interlocking means interposed between said controllers to prevent actuation of said reversing controller except while said accelerating controller is in said off position, and means responsive to actuation of said reversing controller while said vehicle is coasting in either direction to prevent reconnection of said motor to said supply source until said vehicle attains a predetermined low speed.

10. An electric motor control system comprising a direct current motor including an armature and a field exciting winding, switching means for connecting said motor to a source of electric current supply, means for reversing the connections of said armature with respect to said field exciting winding to reverse said motor, and a second source of electric current supply connected to energize said field exciting winding without reversing its normal polarity whenever said switching means is open thereby to generate in said armature a voltage having a polarity dependent upon the direction of rotation of said motor.

11. An electric motor control system comprising a direct current motor including an armature and a field exciting winding, switching means for connecting said motor to a source of electric current supply, means for reversing the connections of said armature with respect to said field exciting winding to reverse said motor, a separate source of electric current supply controlled by said switching means and arranged to energize said field exciting winding without reversing its normal polarity whenever said switching means is open to remove power from said motor, and means responsive only to a reversal of voltage of said armature while said motor is coasting in either direction to render said switching means ineffective to reapply power to said motor.

HAROLD S. OGDEN.